(12) United States Patent
Choi

(10) Patent No.: US 11,836,106 B2
(45) Date of Patent: Dec. 5, 2023

(54) SERIAL COMMUNICATION DEVICE AND SYSTEM FOR MEMORY ACCESS

(71) Applicant: ELECTRONICS AND TELECOMMUNICATIONS RESEARCH INSTITUTE, Daejeon (KR)

(72) Inventor: Yongseok Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/559,248

(22) Filed: Dec. 22, 2021

(65) Prior Publication Data

US 2022/0327085 A1 Oct. 13, 2022

(30) Foreign Application Priority Data

Apr. 8, 2021 (KR) .................. 10-2021-0045717

(51) Int. Cl.
  *G06F 13/42* (2006.01)
(52) U.S. Cl.
  CPC .. *G06F 13/4282* (2013.01); *G06F 2213/0038* (2013.01)

(58) Field of Classification Search
  CPC .................................................. G02B 6/12004
  See application file for complete search history.

(56) References Cited

U.S. PATENT DOCUMENTS

| | | | |
|---|---|---|---|
| 7,328,270 B1* | 2/2008 | Reents | G06F 15/16 709/221 |
| 8,472,474 B2 | 6/2013 | Toyoshima | |
| 8,612,713 B2 | 12/2013 | Kim et al. | |
| 2013/0138858 A1* | 5/2013 | Adler | G06F 13/366 710/305 |
| 2015/0207565 A1 | 7/2015 | Kwon et al. | |

FOREIGN PATENT DOCUMENTS

KR 10-20180023543 3/2018

* cited by examiner

*Primary Examiner* — Henry Tsai
*Assistant Examiner* — Juanito C Borromeo
(74) *Attorney, Agent, or Firm* — KILE PARK REED & HOUTTEMAN PLLC

(57) ABSTRACT

Provided are a serial communication device and a serial communication system for a memory access. The serial communication device for a memory access may include: a system-on-chip (SoC) bus interface receiving a request transaction from a hardware acceleration device; a master protocol processor converting a request transaction received through the SoC bus interface into a packet according to a predetermined packet protocol; and a serial transceiver serial-transmitting the packet.

19 Claims, 9 Drawing Sheets

FIG. 4

| 127 | | 0 |
|---|---|---|
| | Data Component | |

FIG. 5

| 7 | 6 | 5 | 4 3 2 | 1 | 0 | 15 14 13 12 11 10 9 8 |
|---|---|---|---|---|---|---|
| 1 | 11 | | [01/10/11]00 | | 0 | Data Credit [7:0] |
| TC | FC | | Init/Ack/U | | Rsv | |

| 23 22 21 20 19 18 17 16 | 31 30 29 28 27 26 25 24 |
|---|---|
| Header Credit [7:0] | Ack/Nacked Sequence Number [7:0] |

FIG. 6

| 7 | 6 | 5 | 4 | 3 | 2 | 1 | 0 | 15 | 14 | 13 | 12 | 11 | 10 | 9 | 8 |
|---|---|---|---|---|---|---|---|---|---|---|---|---|---|---|---|
| 1 | 00 | | 0000/0001 | | | | 0 | Data Credit [7:0] | | | | | | | |
| TC | DI | | Ack/Nak | | | | Rsv | | | | | | | | |

| 23 | 22 | 21 | 20 | 19 | 18 | 17 | 16 | 31 | 30 | 29 | 28 | 27 | 26 | 25 | 24 |
|---|---|---|---|---|---|---|---|---|---|---|---|---|---|---|---|
| Header Credit [7:0] | | | | | | | | Ack/Nacked Sequence Number [7:0] | | | | | | | |

SERIAL COMMUNICATION DEVICE AND SYSTEM FOR MEMORY ACCESS

CROSS-REFERENCE TO RELATED APPLICATION

This application claims priority to and the benefit of Korean Patent Application No. 10-2021-0045717 filed in the Korean Intellectual Property Office on Apr. 8, 2021, the entire contents of which are incorporated herein by reference.

BACKGROUND OF THE DISCLOSURE

(a) Field of the Disclosure

The present disclosure relates to a serial communication device and a serial communication system for a memory access.

(b) Description of the Related Art

In recent years, the use of a hardware acceleration device has increased in order to increase a processing performance of a computing device. For example, since a correlation between data is very high in an application such as big data, artificial intelligence, deep learning, etc., the amount of data to be resident in a memory is rapidly increasing, and in order to process such a large amount of data, the user of acceleration devices (or accelerator) such as Graphics Processing Units (GPU), Field-Programmable Gate Arrays (FPGA), Application-Specific Integrated Circuits (ASIC), a Digital Signal Processor (DSP), etc., is generalized.

Meanwhile, since the acceleration device also occupies a large amount of memory as a result of processing a large amount of data, the processing result of the acceleration device may be stored in an external memory (or an exterior memory). To this end, a direct memory access (DMA) mechanism between the acceleration device and a network device may be used, but in this case, a network load for interchanging data on a network may sharply increase.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a serial communication device and a serial communication system for a memory access, which are capable of providing a memory capacity capable of storing a processing result of a large amount of data, and minimizing a network node.

An example embodiment of the present disclosure provides a serial communication device for a memory access, which may include: a system-on-chip (SoC) bus interface receiving a request transaction from a hardware acceleration device; a master protocol processor converting a request transaction received through the SoC bus interface into a packet according to a predetermined packet protocol; and a serial transceiver serial-transmitting the packet.

In some example embodiments of the present disclosure, the master protocol processor may include a packet generation module generating a header packet and a data packet from the request transaction received through the SoC bus interface, a first transmission lane transmitting both the header packet and the data packet to the serial transceiver, and one or more second transmission lanes transmitting only the data packet to the serial transceiver.

In some example embodiments of the present disclosure, the first transmission lane and the one or more second transmission lanes include a request payload buffer storing the data packet, a request payload length buffer storing a length of data stored in the request payload buffer, and a request packet formatter performing packet formatting based on the data stored in the request payload buffer and the request payload length buffer.

In some example embodiments of the present disclosure, the one or more second transmission lanes may further include a retry payload buffer, a retry payload address buffer, and a retry length buffer, and a retry controller controlling the retry payload buffer, the retry payload address buffer, and the retry length buffer.

In some example embodiments of the present disclosure, the first transmission lane may further include a request header buffer storing the header packet, and the request packet formatter may perform the packet formatting based on the data stored in the request header buffer, the request payload buffer, and the request payload length buffer.

In some example embodiments of the present disclosure, the first transmission lane may further include a retry header buffer, a retry payload buffer, a retry payload address buffer, and a retry length buffer, and a retry controller controlling the retry header buffer, the retry payload buffer, the retry payload address buffer, and the retry length buffer.

In some example embodiments of the present disclosure, the master protocol processor may include a plurality of reception lanes receiving a completion packet from the serial transceiver, and a packet consumption module providing data received through the plurality of reception lanes to the SoC bus interface.

In some example embodiments of the present disclosure, the plurality of reception lanes may include a completion packet analysis module inspecting the completion packet, and the completion packet analysis module may generate data integrity information for the received packet and provide the generated data integrity information to the request packet formatter.

In some example embodiments of the present disclosure, the request packet formatter may generate Ack when the received packet is normal and Nak when the received packet is abnormal, based on the data integrity information. The completion packet analysis module may generate data integrity information for the received packet and provide the generated data integrity information to the request packet formatter.

Another example embodiment of the present disclosure provides a serial communication device for a memory access, which may include: an SoC bus interface accessed by a system-on-chip (SoC) bus compatible memory controller; a serial transceiver serial-receiving a packet generated according to a predetermined packet protocol; and a slave protocol processor converting the packet received through the serial transceiver and providing the packet to the SoC bus interface.

In some example embodiments of the present disclosure, the slave protocol processor may include a first transmission lane transmitting both a header packet and a data packet received through the serial transceiver, one or more second reception lanes receiving only the data packet, and a packet consumption module transmitting data received through the first reception lane and the one or more second reception lanes to the SoC bus interface.

In some example embodiments of the present disclosure, the first reception lane and the one or more second reception lanes may include a request packet analysis module inspecting the data packet received through the serial transceiver, a request payload buffer storing the data packet, and a request length buffer storing a length of data stored in the request payload buffer.

In some example embodiments of the present disclosure, the request packet analysis module of the first reception lane may additionally inspect the header packet received through the serial transceiver, and the first reception lane may further include a request header buffer storing the header packet.

In some example embodiments of the present disclosure, the slave protocol processor may include a packet generation module generating a completion packet from a response transaction received through the SoC bus interface, and a first transmission lane transmitting the completion packet to the serial transceiver.

In some example embodiments of the present disclosure, the first transmission lane may include a completion payload buffer storing the completion packet, a completion payload length storing a length of data stored in the completion payload buffer; and a completion packet formatter performing packet formatting based on the data stored in the completion payload buffer and the completion payload length buffer.

In some example embodiments of the present disclosure, the first transmission lane may further include a retry payload buffer, a retry payload address buffer, and a retry length buffer, and a retry controller controlling the retry payload buffer, the retry payload address buffer, and the retry length buffer.

In some example embodiments of the present disclosure, the request packet analysis module may generate data integrity information for the received packet and provide the generated data integrity information to the completion packet formatter.

In some example embodiments of the present disclosure, the completion packet formatter may generate Ack when the received packet is normal and Nak when the received packet is abnormal, based on the data integrity information.

Yet another example embodiment of the present disclosure provides a serial communication system for a memory access, which may include: a memory expander receiving a request transaction from a hardware acceleration device, and converting the request transaction into a packet and serial-transmitting the packet according to a predetermined packet protocol; and an external memory interface receiving the packet serial-transmitted according to the predetermined packet protocol, and converting the packet into the request transaction to access a memory device, in which the external memory interface may include a plurality of slave protocol processors converting the serial-transmitted packet into the request transaction.

In some example embodiments of the present disclosure, the memory expander may include a first memory expander and a second memory expander, and the plurality of slave protocol processors may include a first slave protocol processor receiving a packetized request transaction from the first memory expander and accessing the memory device, and a second slave protocol processor receiving the packetized request transaction from the second memory expander and accessing the memory device.

According to example embodiments of the present disclosure, in particular, in an environment in which a hardware acceleration device is used, an external memory is provided to the hardware acceleration device to process a large amount of data or provide a memory capacity capable of storing the processing result, and a transmission performance and efficiency of the processing result of a large amount of data are improved between the hardware acceleration device and the external memory to minimize a network load. Further, the hardware acceleration device may use various types of memory devices without restriction.

BRIEF DESCRIPTION OF THE DRAWINGS

FIGS. 3 to 6 are diagrams for describing implementation examples of a packet protocol which may be used in a serial communication system for a memory access according to an example embodiment of the present disclosure.

DETAILED DESCRIPTION OF THE EMBODIMENTS

Figure 1:
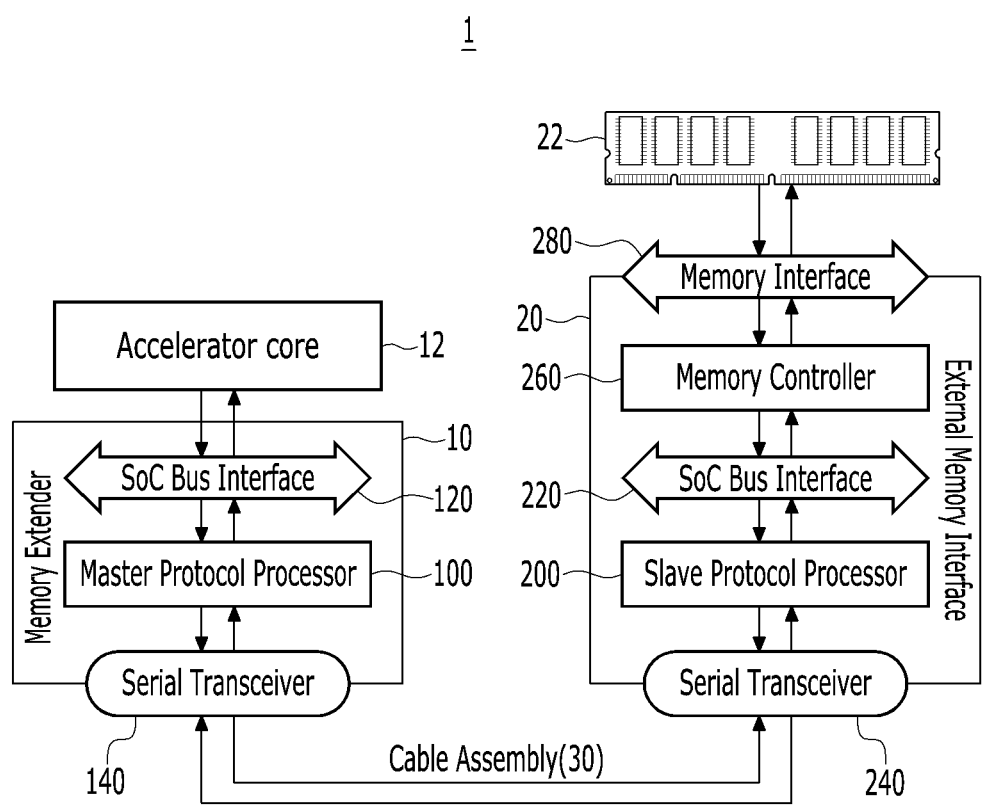
FIG. 1 is a diagram for describing a serial communication system for a memory access according to an example embodiment of the present disclosure.

The present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Through the specification and the claims, unless explicitly described to the contrary, the word "comprise", and variations such as "comprises" or "comprising", will be understood to imply the inclusion of stated elements but not the exclusion of any other elements.

In addition, terms including "part", "unit", "module", and the like disclosed in the specification may mean a unit that is capable of processing at least one function or operation described in this specification and this may be implemented by hardware or software or a combination of hardware and software.

FIG. 1 is a diagram for describing a serial communication system for a memory access according to an example embodiment of the present disclosure.

Referring to FIG. 1, a serial communication system 1 for a memory access according to an example embodiment of the present disclosure may include an accelerator core 12, a memory expander 10, an external memory interface 20, and a memory device 22. The memory expander 10 and the external memory interface 20 may be electrically connected through a cable assembly 30.

The accelerator core 12 may be a core of a hardware acceleration device for increasing a processing performance. Here, the hardware acceleration device may include Graphics Processing Units (GPU), Field-Programmable Gate Arrays (FPGA), Application-Specific Integrated Circuits (ASIC), a Digital Signal Processor (DSP), etc., but the scope of the present disclosure is not limited thereto and may include a core of any acceleration device, and even that, the accelerator core 12 may also include any processing core including a central processing unit (CPU).

The memory expander 10 may receive a request transaction from the hardware acceleration device, specifically, the accelerator core 12 by parallel communication, and convert the request traction into a packet according a predetermined packet protocol, and serial-transmit the packet. Further, the memory expander 10 may receive the packet serial-transmitted according to the predetermined packet protocol, convert the received packet into a response transaction, and provide the response transaction to the accelerator core 12 by the parallel communication. Here, the request transaction and the response transaction may be formats usable in an SoC bus interface, and the packet may be a format usable upon the serial transmission.

Specifically, the request transaction may mean a transaction for a request (e.g., read or write) for accessing the memory device 22 by the accelerator core 12, and the response transaction as a response to the request transaction may mean a transaction (e.g., data read from the memory device 22) generated by the memory device 22 or a memory controller 260 and transmitted to the accelerator core 12.

Further, the memory expander 10 and the external memory interface 20 may send and receive the packet through the cable assembly 30, and to this end, the predetermined packet protocol may be defined between the memory expander 10 and the external memory interface 20. Implementation examples of the packet protocol will be described below through FIGS. 2 to 8.

Specifically, the memory expander 10 may include an SoC bus interface 120 receiving the request transaction from the hardware acceleration device; a master protocol processor 100 converting the request transaction received through the SoC bus interface 120 according to a predetermined packet protocol; and a serial transceiver 140 serial-transmitting the converted packet.

The external memory interface 20 may receive the packet serial-transmitted according to the predetermined packet protocol, convert the received packet into the request transaction, and access the memory device 22 by the parallel communication. Further, the external memory interface 20 may convert the response packet corresponding to the request transaction into the packet and serial-transmit the packet. Here, the request transaction and the response transaction may be formats usable in an SoC bus interface, and the packet may be a format usable upon the serial transmission.

Specifically, the request transaction may mean a transaction for a request (e.g., read or write) for accessing the memory device 22 by the accelerator core 12, and the response transaction as a response to the request transaction may mean a transaction (e.g., data read from the memory device 22) generated by the memory device 22 or a memory controller 260 and transmitted to the accelerator core 12.

Specifically, the external memory interface 20 may include an SoC bus interface 220 accessed by an SoC compatible memory controller 260; a serial transceiver 240 serial-receiving the packet generated according to the predetermined packet protocol; and a slave protocol processor 200 converting the packet received through the serial transceiver 240 and providing the packet to the SoC bus interface 220. Further, the external memory interface 20 may further include the memory controller 260 controlling the memory device 22 and a memory interface 280 providing the interface between the memory controller 260 and the memory device 22.

The memory device 22 may receive and store data from the accelerator core 12 or read data requested by the accelerator core 12 and transmit the read data to the accelerator core 12. For example, the memory device 22 may receive and store result data processed by the accelerator core 12 or read data to be processed by the accelerator core 12 and transmit the read data to the accelerator core 12.

The memory device 22 may be implemented as a volatile memory device including a dynamic random access memory (DRAM) and a static random access memory (SRAM), implemented as a non-volatile memory device including a flash memory, or implemented as a combination of the volatile memory device and the non-volatile memory device.

In particular, the memory device 22 may be implemented outside a computing device mounted with the accelerator core 12. For example, since a data mount processed by the accelerator core 12 is very large, the memory device 22 is provided to the accelerator core 12 in the form of the external memory to allow the accelerator core 12 to read a large amount of data from the memory device 22 and process the data or write the processed result to the memory device 22. Hereinafter, a case where the memory device 22 is implemented as the external memory will be primarily described, but the scope of the present disclosure is not limited thereto, and may also be equally applied to a case where the memory device 22 as an internal memory is mounted on the computing device together with the accelerator core 12.

Figure 2:
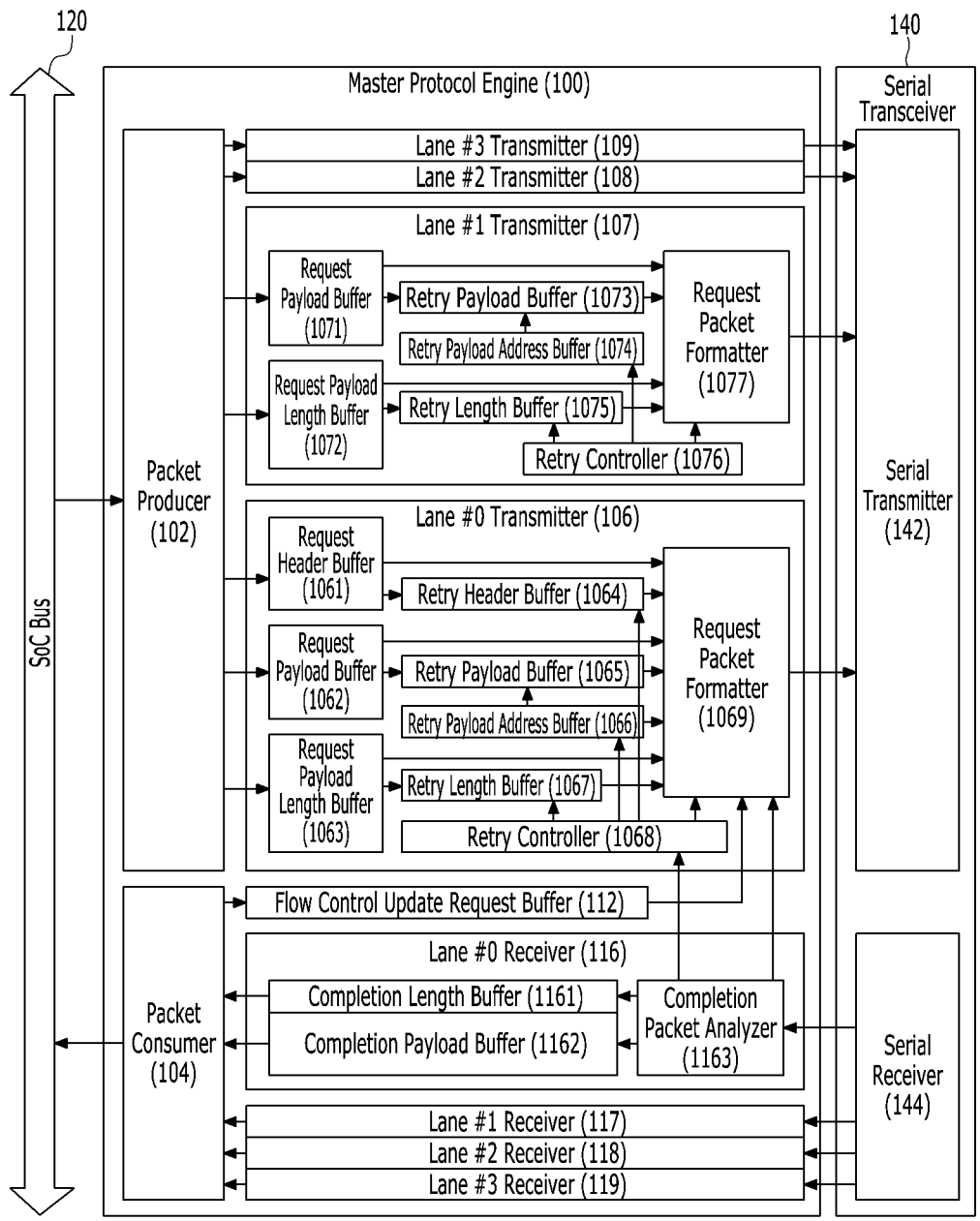
FIG. 2 is a diagram for describing a memory expander according to an example embodiment of the present disclosure.

FIG. 2 is a diagram for describing a memory expander according to an example embodiment of the present disclosure.

Referring to FIG. 2, a memory expander 10 according to an example embodiment of the present disclosure may include the master protocol processor 100, the SoC bus interface 120, and the serial transceiver 140.

The master protocol processor 100 may take charge of mutual conversion between the SoC bus interface 120 and a predetermined packet protocol, and for example, take charge of packet generation, packet consumption, packet formatting, packet inspection (analysis), data flow control, data integrity processing, etc. To this end, the master protocol processor 100 may include a packet generation module 102, a packet consumption module 104, and a plurality of lanes. Here, the plurality of lanes may include a plurality of transmission lanes 106 to 109 and a plurality of reception lanes 116 to 119, and the transmission lane 106 corresponds to the reception lane 116 to form one transmission path, the transmission lane 107 corresponds to the reception lane 117 to form one transmission path, and such structure may also be equally applied to the lanes 108, 109, 118, and 119.

The packet generation module 102 may generate a header packet and a data packet from the request transaction received through the SoC bus interface 120. Specifically, in the case of a transaction for a read request, the packet generation module 102 may generate the header packet indicating the read request, and the header packet may include address information for reading the memory device 22. Unlike this, in the case of a transaction for a write request, the packet generation module 102 may generate a header packet indicating the write request and a data packet for data to be written to the memory device 22, and the header packet may include address information in which the write is to be performed on the memory device 22.

A first transmission lane 106 among the plurality of transmission lanes 106 to 109 may transmit both the header packet and the data packet to the serial transceiver 140 and one or more second transmission lanes 107 to 109 may transmit only the data packet to the serial transceiver 140. That is, one or more second transmission lanes 107 to 109 may transmit only the data packet according to the header packet transmitted by the first transmission lane 106.

The first transmission lane 106 may include a request header buffer 1061, a request payload buffer 1062, a request payload length buffer 1063 and a request packet formatter 1069. The request header buffer 1061 may store the header packet generated by the packet generation module 102, and the request payload buffer 1062 may store the data packet generated by the packet generation module 102. The request payload length buffer 1063 may store a length of data stored in the request payload buffer 1062, and the request packet formatter 1069 may perform packet formatting based on the data stored in the request header buffer 1061, the request payload buffer 1062, and the request payload length buffer 1063.

Here, the packet formatting may mean a packetization task for transmitting the heard packet and the data packet generated by the packet generation module 102 according to a predetermined packet protocol. That is, the request packet formatter 1069 may receive the header packet and the data packet generated by the packet generation module 102 from the request header buffer 1061 and the request payload buffer 1062, and then encode the received header packet and data packet in the form of the packet requested by the serial transmitter 142.

Further, the first transmission lane 106 may further include a retry header buffer 1064, a retry payload buffer 1065, a retry payload address buffer 1066, a retry length buffer 1067, and a retry controller 1068. The retry controller 1068 may control the retry header buffer 1064, the retry payload buffer 1065, the retry payload address buffer 1066, and the retry length buffer 1067. When the data stored in the request header buffer 1061, the request payload buffer 1062, and the request payload length buffer 1063 is transmitted to the request packet formatter 1069, the corresponding data may also be stored in the retry header buffer 1064, the retry payload buffer 1065, the retry payload address buffer 1066, and the retry length buffer 1067, and an address for reading the data in the retry payload buffer 1065 may also be stored in the retry payload address buffer 1066, and used for packet retransmission when packet transmission is incorrect.

Meanwhile, the transmission lane 107 among one or more second transmission lanes 107 to 109 may include a request payload buffer 1071, a request payload length buffer 1072, and a request packet formatter 1077. The request payload buffer 1071 may store the data packet generated by the packet generation module 102, the request payload length buffer 1072 may store a length of data stored in the request payload buffer 1071, and the request packet formatter 1077 may perform packet formatting based on the data stored in the request payload buffer 1071 and the request payload length buffer 1072. The request packet formatter 1077 may receive the data packet generated by the packet generation module 102 from the request payload buffer 1071, and then encode the received data packet in the form of the packet requested by the serial transmitter 142.

Further, the transmission lane 107 may further include a retry payload buffer 1073, a retry payload address buffer 1074, a retry length buffer 1075, and a retry controller 1076. The retry controller 1076 may control the retry payload buffer 1073, the retry payload address buffer 1074, and the retry length buffer 1075. When the data stored in the request payload buffer 1071 and the request payload length buffer 1072 is transmitted to the request packet formatter 1077, the corresponding data may also be stored in the retry payload buffer 1073 and the retry length buffer 1075, and the address for reading the data from the retry payload buffer 1073 is also stored in the retry payload address buffer 1074 and the packet transmission is incorrect, the data may be used for the packet retransmission.

Although omitted in FIG. 2, the transmission lanes 108 and 109 may be implemented in the same form as the transmission lane 107, so a duplicated description will be omitted.

Outputs of the plurality of transmission lanes 106 to 109 may be delivered to the serial transmitter 142 of the serial transceiver 140, and the serial transmitter 142 may transmit data to the external memory interface 20 through multiple lanes corresponding to the plurality of transmission lanes 106 to 109.

Meanwhile, the serial receiver 144 of the serial transceiver 140 may receive data from the external memory interface 20 through multiple lanes corresponding to a plurality of reception lanes 116 to 119, and deliver the received data to the plurality of reception lanes 116 to 119. Here, the data received by the serial receiver 144 may include a completion packet.

The packet consumption module 104 may provide the data received through the plurality of reception lanes 116 to 119 to the SoC bus interface 120.

First, a flow control update request buffer 112 may be used for flow control. The flow control may mean a mechanism that notifies a state of a reception buffer (e.g., a buffer 1162 of a completion payload in FIG. 2) to an opponent transmitter to adjust a quantity of packets transmitted from the opponent transmitter so as to prevent an overflow in the reception buffer. To this end, the packet consumption module 104 may detect how much data is the reception buffer and detect the amount of data, and store information on the detected data amount in the flow control update request buffer 112. Then, the request packet formatter 1069 may read a value stored in the flow control update request buffer 112 and generate a flow control update packet based on the read value, and the flow control update packet may be transmitted to an opponent through the serial transmitter 142.

The reception lane 116 may include a completion packet analysis module 1163, a completion length buffer 1161, and a completion payload buffer 1162. The completion packet analysis module 1163 may inspect a completion packet received from the external memory interface 20 through the serial receiver 144. The completion payload buffer 1162 may store a completion packet of which inspection is completed, and the completion length buffer 1161 may store a length of data stored in the completion payload buffer 1162.

Although omitted in FIG. 2 for clarity of description, the reception lanes 117 to 119 may be implemented in the same form as the reception lane 116, so a duplicated description will be omitted.

Thereafter, when the data of the reception lanes 116 to 119 are available, the packet consumption module 104 may read the data stored in the completion length buffer 1161 and the completion payload buffer 1162, and provide the read data to the SoC bus interface 120 in response to the read request, for example.

The completion packet analysis module 1163 of the reception lane 116 may deliver data integrity information to the request packet formatter 1069, and as a result, the request packet formatter 1069 may generate the flow control packet. Here, the data integrity information may include information (a trigger signal for generating Ack/Nak) indicating generation of Ack when the received packet is normal and generation of Nak when the received packet is abnormal, and a sequence number of the received packet. As a result, the request packet formatter 1069 may generate a data integrity inspection (Ack/Nak) packet. The data integrity inspection packet may include state information of the packet buffer in addition to normal reception information of the packet.

Meanwhile, the flow control packet may include information which may be currently used for checking a packet reception state from the opponent. For example, the flow control packet may include information such as the type of flow control (initialization, initialization confirmation, and current state update), the size of the payload buffer, the size of the header buffer, etc., and additionally include the normal reception information of the packet.

Information included in the flow control packet and the data integrity inspection packet may be similar, but is different in terms of transmission timing in that the flow control packet is transmitted when a change occurs in the buffer and the data integrity inspection packet is transmitted when the packet is received. Further, there is a difference even in terms of a transmission frequency in that the flow control packet is periodically transmitted, but the data integrity inspection packet is transmitted only when the memory transaction packet is received.

When the completion packet analysis module 1163 of the reception lane 116 receives positive acknowledgement (Ack) or negative acknowledgement (Nak), the completion packet analysis module 1163 may notify the reception of Ack or Nak to the retry controller 1068 of the transmission lane 106.

When the retry controller 1068 receives Ack, the retry controller 1068 may transfer points indicating the retry header buffer 1064, the retry payload buffer 1065, the retry payload address buffer 1066, and the retry length buffer 1067 next to the packet which is determined to be normally transmitted, in order to secure a retry buffer space. Meanwhile, when the retry controller 1068 receives Nak, the retry controller 1068 may perform packet retransmission by reading the data stored in the retry header buffer 1064, the retry payload buffer 1065, the retry payload address buffer 1066, and the retry length buffer 1067.

Likewise, when the retry controller 1076 receives Ack, the retry controller 1076 may transfer points indicating the retry payload buffer 1073, the retry payload address buffer 1074, and the length buffer 1075 next to the packet which is determined to be normally transmitted, in order to secure the retry buffer space. Meanwhile, when the retry controller 1076 receives Nak, the retry controller 1076 may perform the packet retransmission by reading the data stored in the retry payload buffer 1073, the retry payload address buffer 1074 and the retry length buffer 1075.

Of course, the packet retransmission may be performed even when Ack or Nak corresponding to the transmitted packet is not received for a predetermined time after the memory expander 10 transmits the packet in addition to a case where the retry controllers 1068 and 1074 receive Nak.

When the packet retransmission is performed, data deleted from the buffer is stored in the retry buffer again according to retransmission and until Ack for the packet retransmission is received, the packet retransmission may be additionally performed. That is, data in which the packet retransmission is performed may be stored in the header buffer 1064, the retry payload buffers 1065 and 1073, the retry payload address buffers 1066 and 1074, and the retry length buffers 1067 and 1075 again.

Although omitted in FIG. 2 for clarity of description, the reception lanes 117 to 119 may be implemented in the same form as the reception lane 116, so a duplicated description will be omitted.

Further, although it is illustrated that a plurality of lanes is implemented as four lanes (each includes the transmission lane and the reception lane) in FIG. 2, this is for convenience of description and the scope of the present disclosure is not limited thereto, and the plurality of lanes may be implemented to include any number of lanes according to a specific implementation purpose, of course. When the plurality of lanes is implemented as four lanes, each lane takes charges of ¼ of an SoC bus bandwidth, and as a result, multi-lane based data transmission/reception may be implemented between the memory expander 10 and the external memory interface 20.

By such a scheme, when the memory expander 10 accesses the memory device 22 through the external memory interface 20, the packet flow may be facilitated while guaranteeing the integrity of the packet.

FIGS. 3 to 6 are diagrams for describing implementation examples of a packet protocol which may be used in a serial communication system for a memory access according to an example embodiment of the present disclosure.

Figure 3:
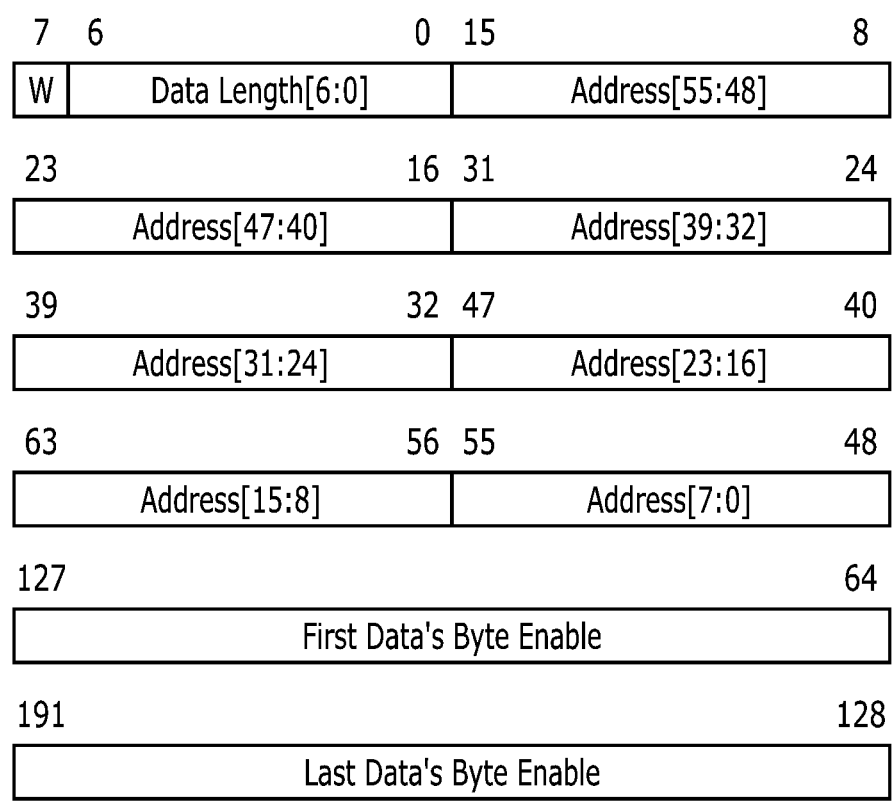

Referring to FIG. 3, the header packet according to an implementation example of the packet protocol between the memory expander 10 and the external memory interface 20 may include a field W for identifying whether the request transaction is a memory read or a memory write, a data length, an address, first data's byte enable, and last data's byte enable.

Such a structure of the header packet is implemented to include only minimum required information in order to minimize an influence on the network load to prevent unnecessary field waste and minimize even a broadcast delay.

Subsequently, referring to FIG. 4, the data packet according to an implementation example of the packet protocol between the memory expander 10 and the external memory interface 20 may be implemented in units of 128 bits, and several data packets in units of 128 bits may be appended.

Meanwhile, referring to FIG. 5, the flow control packet according to an implementation example of the packet protocol between the memory expander 10 and the external memory interface 20 may include a field TC for identifying the transaction control packet, a field FC for indicating a class of the transaction control packet, a field (Init/Ack/U) indicating a sub class of the transaction control packet, and a reservation field Rsv. Here, the sub class may represent the type of flow control (initialization, initialization confirmation, and current state update).

Further, the flow control packet may include a field indicating the size of the payload buffer, i.e., data credit and a field indicating the size of the header buffer, i.e., header credit.

Further, the flow control packet may also include a field representing a sequence number received for considering an integration of the flow control packet and the data integrity packet henceforth, i.e., a normal reception information (Ack/Nacked Sequence Number) field of the packet. When the flow control packet does not include the normal reception information (Ack/Nacked Sequence Number) field of the packet, the corresponding space may be left as the reservation field.

Subsequently, referring to FIG. 6, the data integrity inspection packet according to an implementation example of the packet protocol between the memory expander 10 and the external memory interface 20 may include a field TC for identifying the transaction control packet, a field DI for indicating a class of the transaction control packet, a field (Ack/Nak) indicating the type of Ack/Nak, and the reservation field Rsv.

Further, the data integrity inspection packet may include a normal reception information (Ack/Nacked Sequence Number) field of the packet for identifying whether to normally receive the packet.

Meanwhile, the data integrity inspection packet may further selectively include the field indicating the size of the payload buffer, i.e., the data credit and the field indicating the size of the header buffer, i.e., the header credit.

Of course, the forms of the packets illustrated in FIGS. 3 to 7 are just example, and specific matters such as structures of packets and the size of each field may be changed in any degree according to an implementation purpose.

Figure 7:
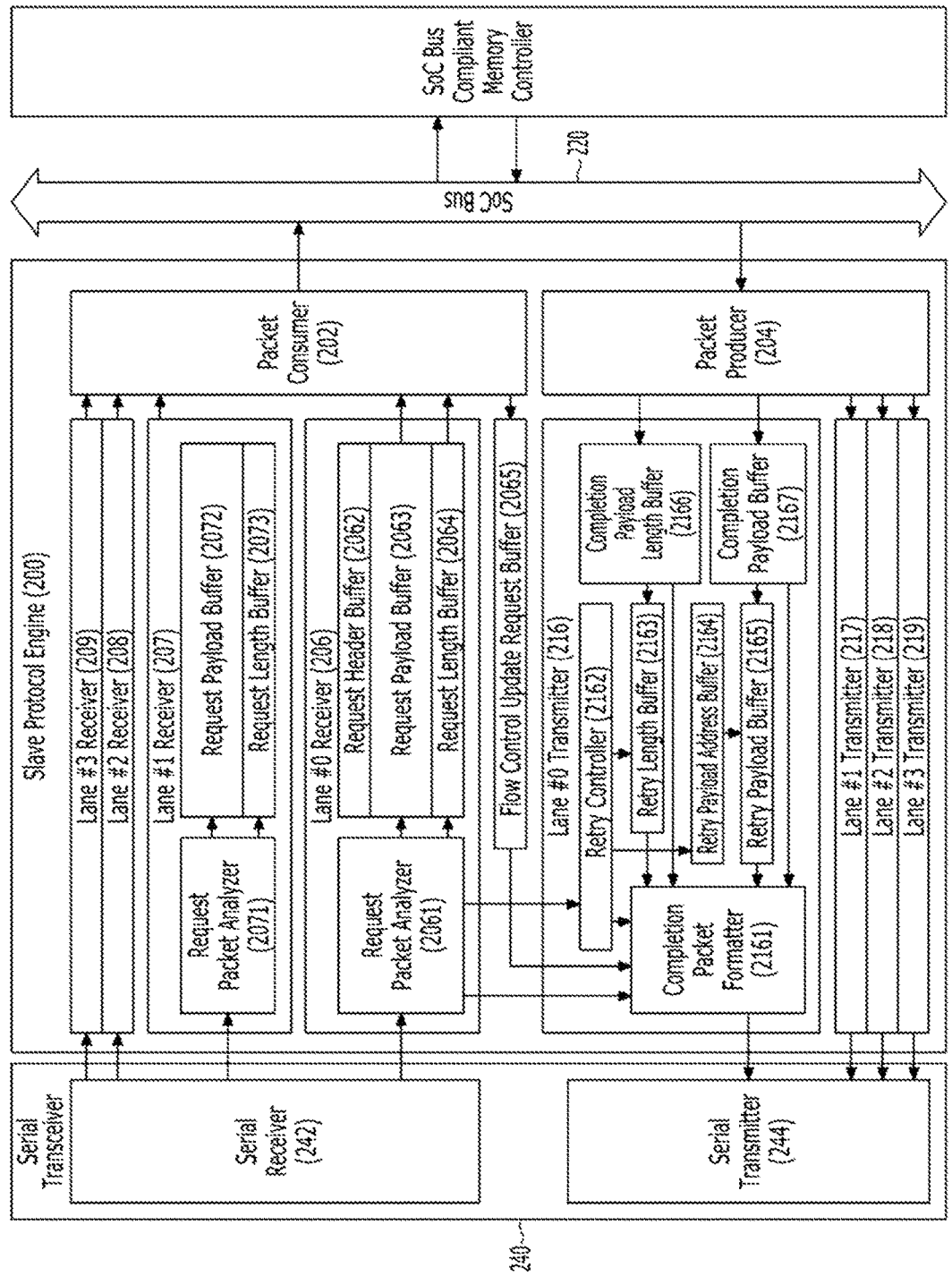
FIG. 7 is a diagram for describing an external memory interface according to an example embodiment of the present disclosure.

FIG. 7 is a diagram for describing an external memory interface according to an example embodiment of the present disclosure.

Referring to FIG. 7, the external memory interface 20 according to an example embodiment of the present disclosure may include the slave protocol processor 200, the SoC bus interface 220, and the serial transceiver 240.

The slave protocol processor 200 may take charge of mutual conversion between the packetized request transaction generated by the master protocol processor 100, and the SoC bus interface 220, and for example, take charge of request packet consumption, response packet generation, packet formatting, packet inspection (analysis), data flow control, data integrity processing, etc. To this end, the slave protocol processor 200 may include a packet consumption module 202, a packet generation module 204, and a plurality of lanes. Here, the plurality of lanes may include a plurality of reception lanes 206 to 209 and a plurality of transmission lanes 216 to 219, and the reception lane 206 corresponds to the transmission lane 216 to form one transmission path, the reception lane 207 corresponds to the transmission lane 217 to form one transmission path, and such structure may also be equally applied to the lanes 208, 209, 218, and 219.

The serial receiver 242 of the serial transceiver 240 may receive data from the memory expander 10 through multiple lanes corresponding to the plurality of reception lanes 206 to 209, and deliver the received data to the plurality of reception lanes 206 to 209.

A first reception lane 206 among the plurality of reception lanes 206 to 209 may transmit both the header packet and the data packet to the serial transceiver 240 and one or more second reception lanes 207 to 209 may transmit only the data packet to the packet consumption module 202. That is, one or more second reception lanes 207 to 209 may transmit only the data packet according to the header packet transmitted by the first reception lane 206.

The packet consumption module 202 may provide the data received through the plurality of reception lanes 206 to 209 to the SoC bus interface 220.

The first reception lane 206 may include a request packet analysis module 2061, request header buffer 2062, a request payload buffer 2063, and a request length buffer 2064. The request packet analysis module 2061 may inspect the header packet and the data packet received through the serial transceiver 240. The request header buffer 2062 may store a header packet of which inspection is completed. The request payload buffer 2063 may store a data packet of which inspection is completed, and the request length buffer 2064 may store a length of data stored in the request payload buffer 2063.

Meanwhile, the reception lane 207 among one or more second reception lanes 207 to 209 may include a request packet analysis module 2071, a request payload buffer 2072, and a request length buffer 2073. The request packet analysis module 2071 may inspect the data packet received through the serial transceiver 240. The request payload buffer 2063 may store a data packet of which inspection is completed, and the request length buffer 2064 may store a length of data stored in the request payload buffer 2063.

Although omitted in FIG. 7 for clarity of description, the reception lanes 208 and 209 may be implemented in the same form as the reception lane 207, so a duplicated description will be omitted.

Thereafter, when the data of the reception lanes 206 to 209 are available, the packet consumption module 202 may read the data stored in the request header buffer 2062, the request payload buffers 2063 and 2072, and the request length buffers 2064 and 2073, and generate a memory write signal or a memory read signal, and then finally provide the generated memory write signal or the memory read signal to the memory controller 260 through the SoC bus interface 220, for example.

Meanwhile, the packet generation module 204 may generate a completion packet from a response packet received through the SoC bus interface 220. For example, a response transaction to the memory read signal may be generated as the completion packet, and the completion packet may include data read from the memory device 22.

The transmission lane 216 may transmit the completion packet to the serial transceiver 240. The transmission lane 216 may include a completion payload buffer 2167, a completion payload length buffer 2166, and a completion packet formatter 2161. The completion payload buffer 2167 may store the completion packet generated by the packet generation module 204, the completion payload length buffer 2166 may store a length of data stored in the completion payload buffer 2167, and the completion packet formatter 2161 may perform packet formatting based on the data stored in the completion payload buffer 2167 and the completion payload length buffer 2166.

Further, the transmission lane 216 may further include a retry payload buffer 2165, a retry payload address buffer 2164, a retry length buffer 2163, and a retry controller 2162. The retry controller 2162 may control the retry payload buffer 2165, the retry payload address buffer 2164, and the retry length buffer 2163. When the data stored in the completion payload buffer 2167 and the completion payload length buffer 2166 is transmitted to the completion packet formatter 2161, the corresponding data may also be stored in the retry payload buffer 2165 and the retry length buffer 2163, and the address for reading the data from the retry payload buffer 2165 is also stored in the retry payload address buffer 2164 and the packet transmission is incorrect, the data may be used for the packet retransmission.

Although omitted in FIG. 7 for clarity of description, the transmission lanes 217 to 219 may be implemented in the same form as the transmission lane 216, so a duplicated description will be omitted.

Outputs of the plurality of transmission lanes 216 to 219 may be delivered to the serial transmitter 242 of the serial transceiver 240, and the serial transmitter 242 may transmit data to the memory expander 10 through multiple lanes corresponding to the plurality of transmission lanes 216 to 219.

The request packet analysis module 2061 of the reception lane 206 may deliver data integrity information to the completion packet formatter 2161, and as a result, the completion packet formatter 2161 may generate the flow control packet. Here, the data integrity information may include information (a trigger signal for generating Ack/Nak) indicating generation of Ack when the received packet is normal and generation of Nak when the received packet is abnormal, and a sequence number of the received packet. As a result, the completion packet formatter 2161 may generate a data integrity inspection (Ack/Nak) packet. The data integrity inspection packet may include state information of the packet buffer in addition to normal reception information of the packet.

Meanwhile, the flow control packet may include information which may be currently used for checking a packet reception state from the opponent. For example, the flow control packet may include information such as the type of flow control (initialization, initialization confirmation, and current state update), the size of the payload buffer, the size of the header buffer, etc., and additionally include the normal reception information of the packet.

When the request packet analysis module 2061 of the reception lane 206 receives positive acknowledgement (Ack) or negative acknowledgement (Nak), the request packet analysis module 2061 may notify the reception of Ack or Nak to the retry controller 2162 of the transmission lane 216.

When the retry controller 2162 receives Ack, the retry controller 2162 may transfer points indicating the retry payload buffer 2165, the retry payload address buffer 2164, and the retry length buffer 2163 next to the packet which is determined to be normally transmitted, in order to secure the retry buffer space. Meanwhile, when the retry controller 2162 receives Nak, the retry controller 2165 may perform the packet retransmission by reading the data stored in the retry payload address buffer 2164 and the retry length buffer 2163.

Of course, the packet retransmission may be performed even when Ack or Nak corresponding to the transmitted packet is not received for a predetermined time after the external memory interface 20 transmits the packet in addition to a case where the retry controller 2162 receives Nak.

When the packet retransmission is performed, data deleted from the buffer is stored in the retry buffer again according to retransmission and until Ack for the packet retransmission is received, the packet retransmission may be additionally performed. That is, data in which the packet retransmission is performed may be stored in the retry payload buffer 2165, the retry payload address buffer 2164, and the retry length buffer 2163 again.

Although omitted in FIG. 7 for clarity of description, the reception lanes 207 to 209 may be implemented in the same form as the reception lane 206, so a duplicated description will be omitted.

Further, although it is illustrated that a plurality of lanes is implemented as four lanes (each includes the transmission lane and the reception lane) in FIG. 7, this is for convenience of description and the scope of the present disclosure is not limited thereto, and the plurality of lanes may be implemented to include any number of lanes according to a specific implementation purpose, of course. When the plurality of lanes is implemented as four lanes, each lane takes charges of ¼ of an SoC bus bandwidth, and as a result, multi-lane based data transmission/reception may be implemented between the memory expander 10 and the external memory interface 20.

By such a scheme, when the memory expander 10 accesses the memory device 22 through the external memory interface 20, the packet flow may be facilitated while guaranteeing the integrity of the packet.

Figure 8:
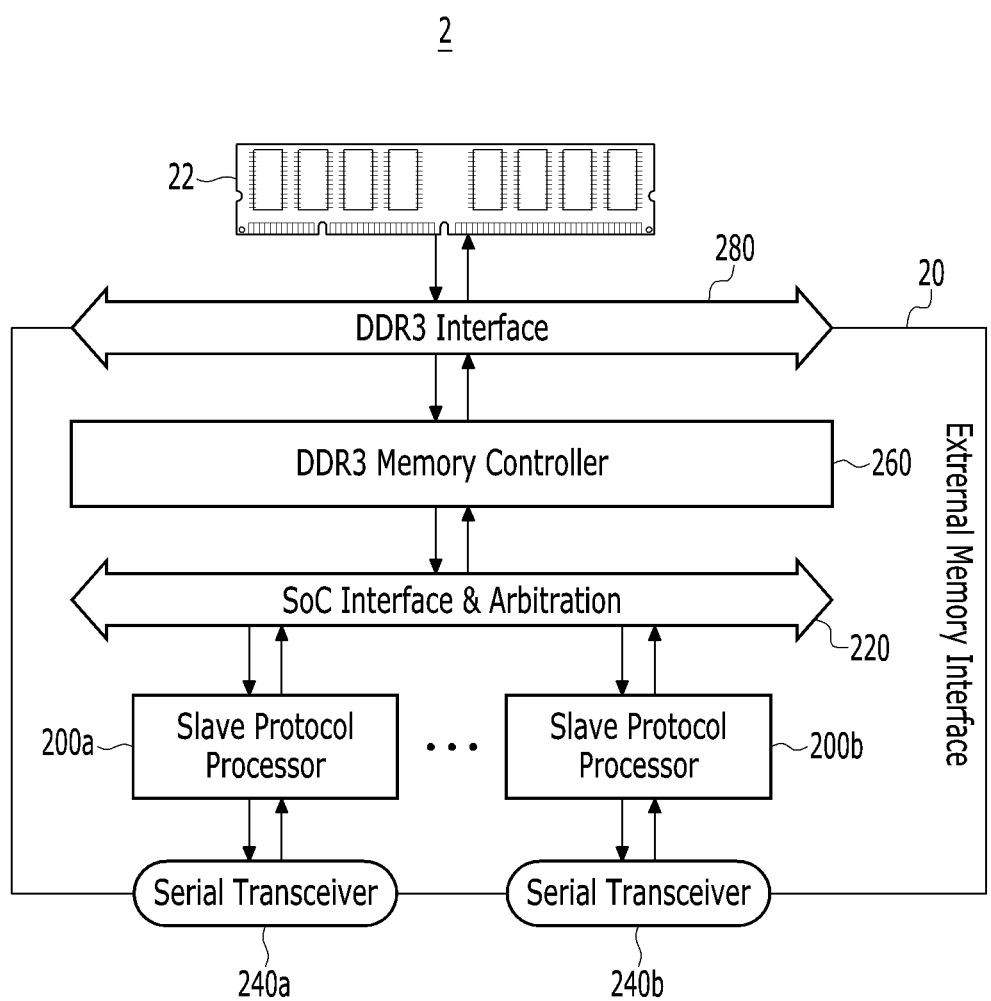
FIG. 8 is a diagram for describing a serial communication system for a memory access according to an example embodiment of the present disclosure.

FIG. 8 is a diagram for describing a serial communication system for a memory access according to an example embodiment of the present disclosure.

Referring to FIG. 8, a serial communication system 2 for a memory access according to an example embodiment of the present disclosure may include a plurality of serial transceivers 240*a* and 240*b* and a plurality of slave protocol processors 200*a* and 220*b* so that the external memory interface 20 is connected to a plurality of hardware acceleration devices (or accelerator cores).

That is, the plurality of hardware acceleration devices may include a first hardware acceleration device and a second hardware acceleration device, and the plurality of serial transceivers 240*a* and 240*b* may receive a packet serial-transmitted through a first memory expander converting a request transaction of the first hardware acceleration device into the packet and serial-transmitting the packet according to a predetermined protocol and a second memory expander converting a request transaction of the second hardware acceleration device into the packet, and serial-transmitting the packet according to a predetermined protocol.

In addition, a first slave protocol processor 200*a* of the plurality of slave protocol processors 200*a* and 220*b* may access the memory device 22 by receiving the packetized request transaction from the first memory expander, and a second slave protocol processor 200*b* may access the memory device 22 by receiving the packetized request transaction from the second memory expander.

That is, the external memory interface 20 may include the plurality of serial transceivers 240*a* and 240*b* and the plurality of slave protocol processors 200*a* and 220*b* as large as the number of hardware acceleration devices.

In some example embodiments of the present disclosure, when the plurality of slave protocol processors 200*a* and 220*b* contend with each other in order to use one memory controller 260, arbitration logic for arbitrating this may also be additionally implemented in the external memory interface 20.

Figure 9:
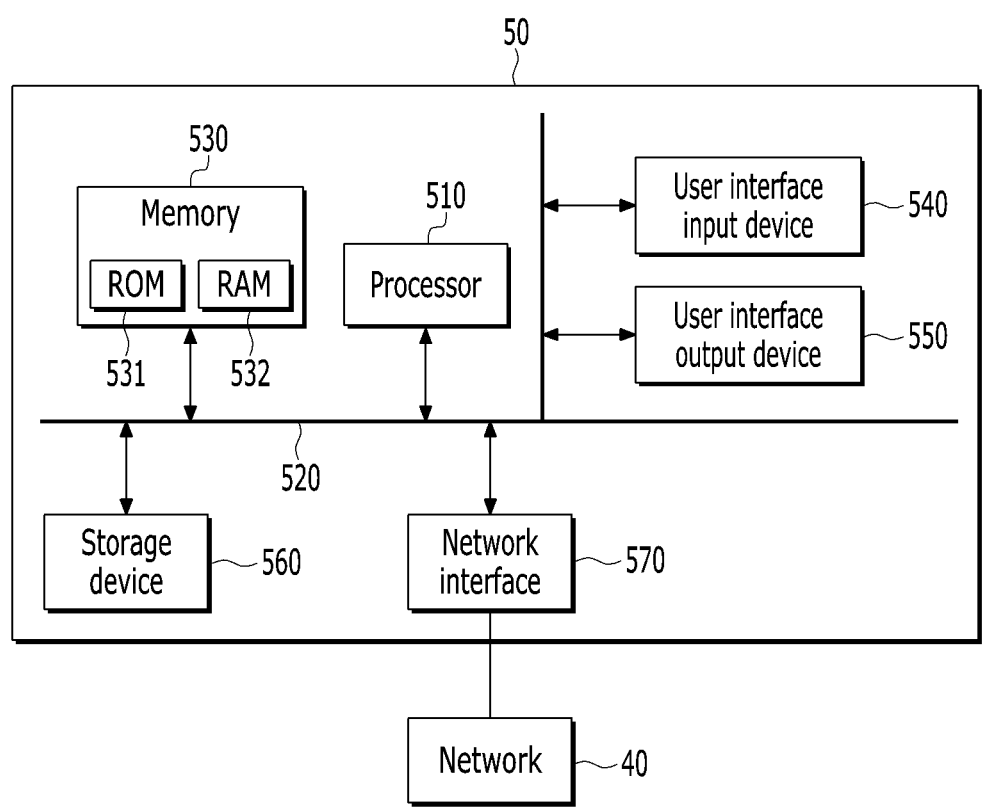
FIG. 9 is a block diagram for describing a computing device for implementing a serial communication device and a serial communication system for a memory access according to example embodiments of the present disclosure.

FIG. 9 is a block diagram for describing a computing device for implementing a serial communication device and a serial communication system for a memory access according to example embodiments of the present disclosure.

Referring to FIG. 9, a serial communication device and a serial communication system for a memory access according to example embodiments of the present disclosure may be implemented by using a computing device 50.

The computing device 50 may include at least one of a processor 510, a memory 530, a user interface input device 540, a user interface output device 550, and a storage device 560 which communicate through a bus 520. The computing device 50 may also include a network interface 570 electrically connected to the network 40, e.g., a wireless network. The network interface 570 may transmit/receive a signal to/from another entity through the network 40.

The processor 510 may be implemented by various types including an application processor (AP), a central processing unit (CPU), a graphic processing unit (GPU), etc., and may be any semiconductor device executing a command stored in the memory 530 or the storage device 560. The processor 510 may be configured to implement functions and methods described in FIGS. 1 to 8.

The memory 530 and the storage device 560 may be various types of volatile or non-volatile storage media. For example, the memory may include a read-only memory (ROM) 531 and a random access memory (RAM) 532. In an example embodiment of the present disclosure, the memory 530 may be positioned inside or outside the processor 510 and the memory 530 may be connected to the processor 510 through various means which is already known.

Further, the serial communication device and the serial communication system for a memory access according to example embodiments of the present disclosure may be implemented by a program or software executed by the computing device 50, and the program or the software may be stored in a computer readable medium.

Further, the serial communication device and the serial communication system for a memory access according to example embodiments of the present disclosure may be implemented by hardware which may be electrically connected to the computing device 50.

According to example embodiments of the present disclosure described up to now, in particular, in an environment in which a hardware acceleration device is used, an external memory is provided to the hardware acceleration device to process a large amount of data or provide a memory capacity capable of storing the processing result, and a transmission performance and efficiency of the processing result of a large amount of data are improved between the hardware acceleration device and the external memory to minimize a network load. Further, the hardware acceleration device may use various types of memory devices without restriction.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous.

In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A serial communication device for a memory access, comprising:
   a system-on-chip (SoC) bus interface receiving a request transaction from a hardware acceleration device;
   a master protocol processor converting a request transaction received through the SoC bus interface into a packet according to a predetermined packet protocol; and
   a serial transceiver serial-transmitting the packet,
   wherein:
   the master protocol processor includes
   a packet generation module generating a header and a data packet from the request transaction received through the SoC bus interface, and
   a first transmission lane transmitting both the header packet and the data packet to the serial transceiver.

2. The serial communication device for a memory access of claim 1, wherein:
   the master protocol processor further includes
   one or more second transmission lanes transmitting only the data packet to the serial transceiver.

3. The serial communication device for a memory access of claim 2, wherein:
   the first transmission lane and the one or more second transmission lanes include
   a request payload buffer storing the data packet,
   a request payload length buffer storing a length of data stored in the request payload buffer, and
   a request packet formatter performing packet formatting based on the data stored in the request payload buffer and the request payload length buffer.

4. The serial communication device for a memory access of claim 3, wherein:
   the one or more second transmission lanes further include
   a retry payload buffer, a retry payload address buffer, and a retry length buffer, and a retry controller controlling the retry payload buffer, the retry payload address buffer, and the retry length buffer.

5. The serial communication device for a memory access of claim 3, wherein:
   the first transmission lane further includes
   a request header buffer storing the header packet, and
   the request packet formatter,
   performs the packet formatting based on the data stored in the request header buffer, the request payload buffer, and the request payload length buffer.

6. The serial communication device of claim 5, wherein:
   the first transmission lane further includes
   a retry header buffer, a retry payload buffer, a retry payload address buffer, and a retry length buffer, and a retry controller controlling the retry header buffer, the retry payload buffer, the retry payload address buffer, and the retry length buffer.

7. The serial communication device of claim 3, wherein:
   the master protocol processor includes
   a plurality of reception lanes receiving a completion packet from the serial transceiver, and
   a packet consumption module providing data received through the plurality of reception lanes to the SoC bus interface.

8. The serial communication device for a memory access of claim 7, wherein:
   the plurality of reception lanes includes a completion packet analysis module inspecting the completion packet, and
   the completion packet analysis module generates data integrity information for the received packet and provides the generated data integrity information to the request packet formatter.

9. The serial communication device for a memory access of claim 8, wherein:
   the request packet formatter generates Ack when the received packet is normal and Nak when the received packet is abnormal, based on the data integrity information.

10. A serial communication device for a memory access, comprising:
    an SoC bus interface accessed by a system-on-chip (SoC) bus compatible memory controller;
    a serial transceiver serial-receiving a packet generated according to a predetermined packet protocol; and
    a slave protocol processor converting the packet received through the serial transceiver and providing the packet to the SoC bus interface,
    wherein
    the slave protocol processor includes
    a first transmission lane transmitting both a header packet and a data packet received through the serial transceiver, and
    one or more second reception lanes receiving only the data packet.

11. The serial communication device for a memory access of claim 10, wherein:
    the slave protocol processor further includes
    a packet consumption module transmitting data received through the first reception lane and the one or more second reception lanes to the SoC bus interface.

12. The serial communication device for a memory access of claim 11, wherein:
    the first reception lane and the one or more second reception lanes include
    a request packet analysis module inspecting the data packet received through the serial transceiver,
    a request payload buffer storing the data packet, and
    a request length buffer storing a length of data stored in the request payload buffer.

13. The serial communication device for a memory access of claim 12, wherein:
    the request packet analysis module of the first reception lane additionally inspects the header packet received through the serial transceiver, and
    the first reception lane further includes a request header buffer storing the header packet.

14. The serial communication device for a memory access of claim 12, wherein:
    the slave protocol processor includes a packet generation module generating a completion packet from a response transaction received through the SoC bus interface, and a first transmission lane transmitting the completion packet to the serial transceiver.

15. The serial communication device for a memory access of claim 14, wherein:

the first transmission lane includes a completion payload buffer storing the completion packet, a completion payload length storing a length of data stored in the completion payload buffer; and a completion packet formatter performing packet formatting based on the data stored in the completion payload buffer and the completion payload length buffer.

16. The serial communication device for a memory access of claim 15, wherein:

the first transmission lane further includes a retry payload buffer, a retry payload address buffer, and a retry length buffer, and a retry controller controlling the retry payload buffer, the retry payload address buffer, and the retry length buffer.

17. The serial communication device for a memory access of claim 15, wherein:

the request packet analysis module generates data integrity information for the received packet and provides the generated data integrity information to the completion packet formatter.

18. The serial communication device for a memory access of claim 15, wherein:

the completion packet formatter generates Ack when the received packet is normal and Nak when the received packet is abnormal, based on the data integrity information.

19. A serial communication system for a memory access, comprising:

a memory expander receiving a request transaction from a hardware acceleration device, and converting the request transaction into a packet and serial-transmitting the packet according to a predetermined packet protocol; and an external memory interface receiving the packet serial-transmitted according to the predetermined packet protocol, and converting the packet into the request transaction to access a memory device, wherein the external memory interface includes a plurality of slave protocol processors converting the serial-transmitted packet into the request transaction, and, wherein the memory expander includes a first memory expander and a second memory expander, and the plurality of slave protocol processors includes a first slave protocol processor receiving a packetized request transaction from the first memory expander and accessing the memory device; and a second slave protocol processor receiving the packetized request transaction from the second memory expander and accessing the memory device.

* * * * *